March 3, 1970  J. A. OGLE  3,498,864
METHOD OF PRODUCING A FIBER OPTICAL ARTICLE
BY MOLDING AND LAMINATING
Original Filed March 12, 1964  4 Sheets-Sheet 1
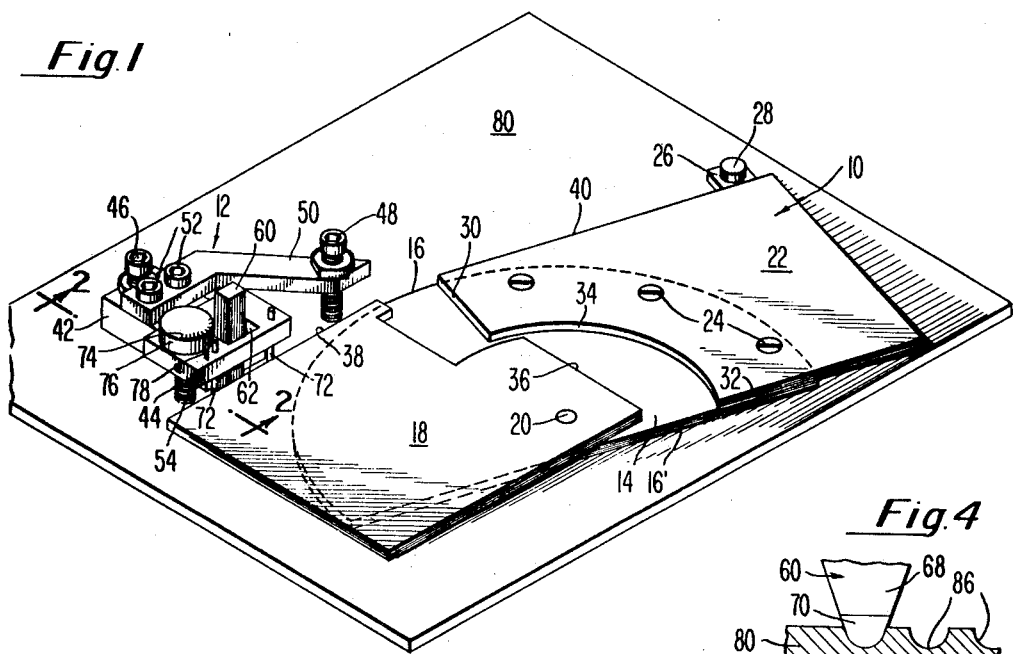
INVENTOR.
JAMES A. OGLE March 3, 1970  J. A. OGLE  3,498,864
METHOD OF PRODUCING A FIBER OPTICAL ARTICLE
BY MOLDING AND LAMINATING
Original Filed March 12, 1964  4 Sheets-Sheet 2
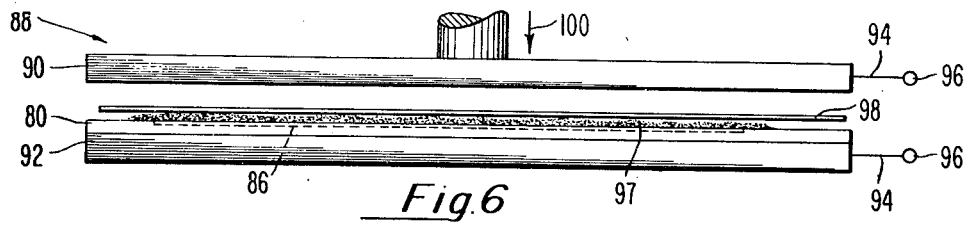
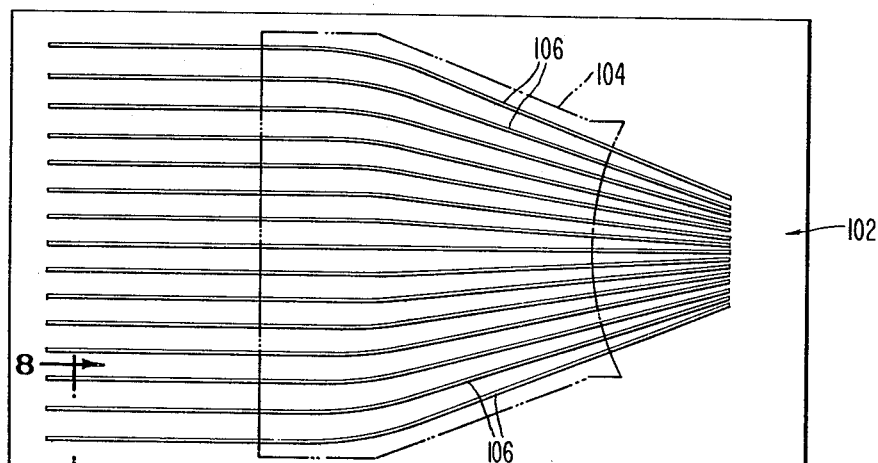
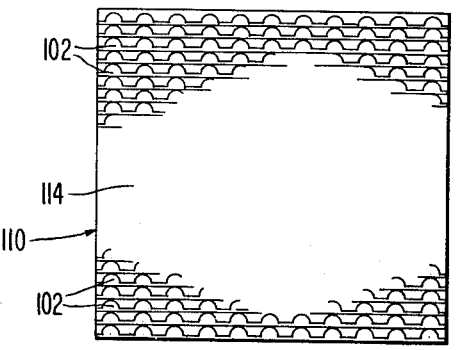
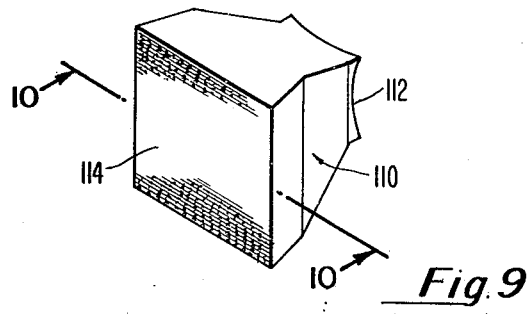
INVENTOR.
JAMES A. OGLE

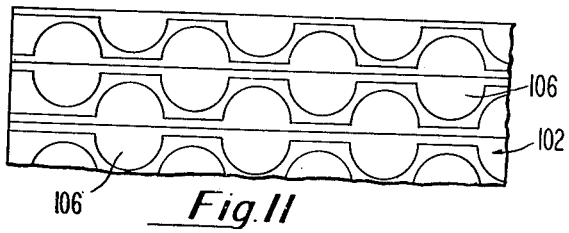
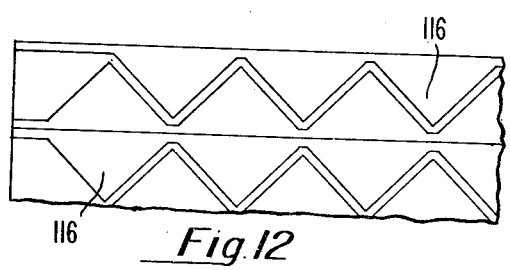
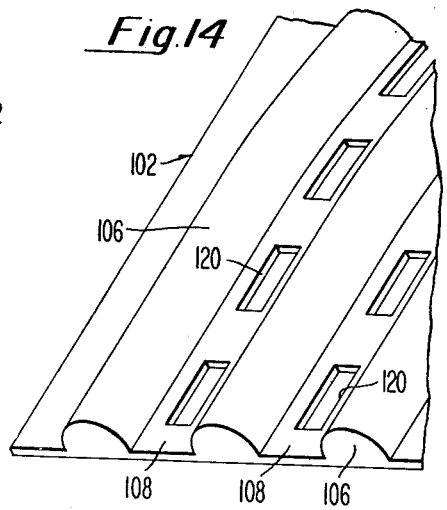
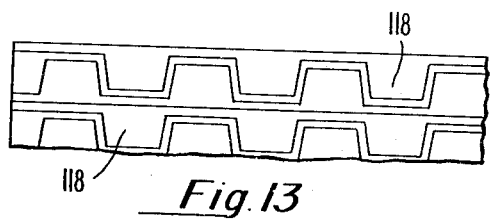
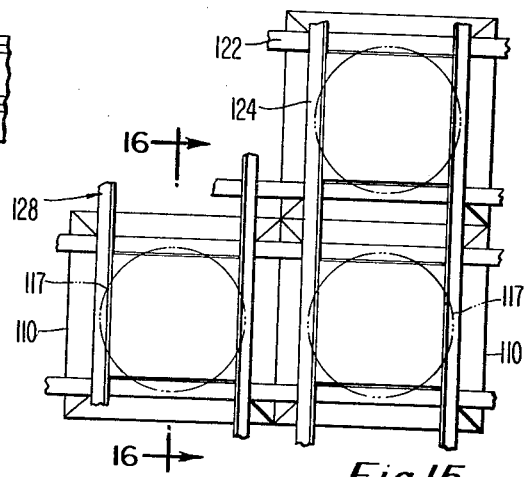
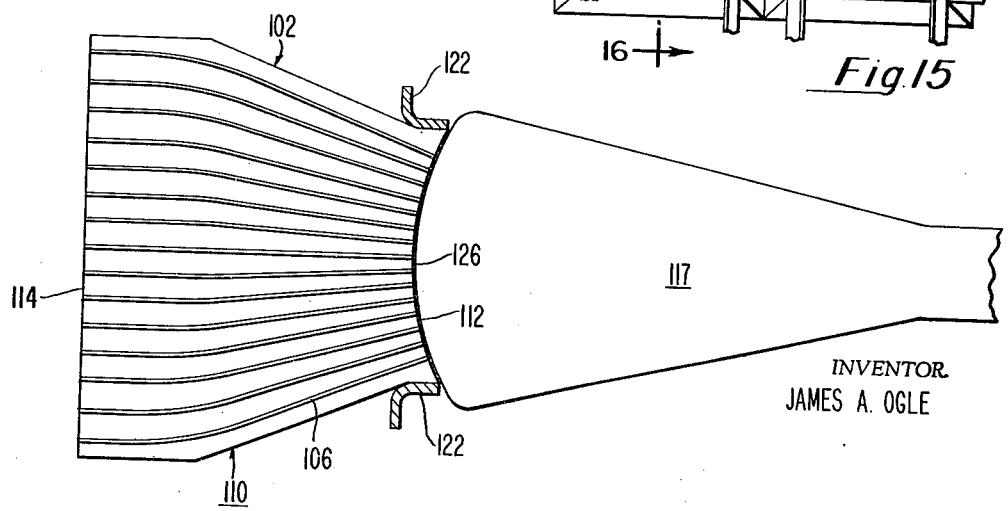
INVENTOR.
JAMES A. OGLE

INVENTOR.
JAMES A. OGLE

United States Patent Office 3,498,864
Patented Mar. 3, 1970

3,498,864
METHOD OF PRODUCING A FIBER OPTICAL ARTICLE BY MOLDING AND LAMINATING
James A. Ogle, Paoli, Pa., assignor to Burroughs Corporation, Detroit, Mich., a corporation of Michigan
Original application Mar. 12, 1964, Ser. No. 351,400, now Patent No. 3,391,969, dated July 9, 1968. Divided and this application Jan. 22, 1968, Ser. No. 725,550
Int. Cl. B29c 17/02; B32b 31/00
U.S. Cl. 156—242                                          6 Claims

ABSTRACT OF THE DISCLOSURE

The present invention relates to a method of producing a fiber optical article by molding and laminating techniques employing planar fiber optical sheets which may be stacked together and adhesively bonded so as to provide a unitary magnifying fiber optical assembly.

---

This is a division of application Ser. No. 351,400, filed Mar. 12, 1964, now U.S. Patent 3,391,969.

The present invention relates to a method and apparatus for producing fiber optic articles of manufacture and, more particularly, although not necessarily exclusively, to a novel method and means heretofore unknown for producing planar sheet fiber optical elements in a simple, efficient and relatively inexpensive fashion.

With still more specificity, the present invention has to do with the manufacture of sheet fiber optic elements in a manner enabling a plurality of such sheets to be stacked together in a bundle which may be operably associated with an output device producing a desired pattern, image, symbol or display in a manner permitting such pattern, image, symbol or display to be utilized as a wall type display.

With still more particularity, the invention has to do with fiber optic articles of manufacture for use with cathode ray tube type display apparatus wherein fiber optic bundles enable the scale of the display to be increased or magnified in a manner permitting a small scale display to cover a larger area, such for example, as the wall of a room.

It is known to assemble glass fibers into a bundle so that an image at one end thereof can be projected or reflected therethrough, for viewing, at the opposite end thereof. It is also known to utilize such glass fibers in a manner permitting the image at the input end to be magnified at the output end. Such glass fibers however are extremely expensive, relatively difficult to manufacture, and not adaptable to the wide variety of uses to which the present invention finds relative ease of application.

It is an object therefore of the present invention to provide a new, novel and efficient manufacturing method, apparatus and article of manufacture utilizing fiber optics.

Another object of the invention is to provide a novel method of fabricating fiber optic apparatus with other than glass material.

Still a further object of the invention is the provision of a novel apparatus, jig or fixture for producing obverse and/or reverse molds for fabricating fiber optical devices.

It is also an object of the invention to produce a novel fiber optic article of manufacture from synthetic, plastic material.

It is also an object of the invention to provide a plano-sheet fiber optic article of manufacture which can be stacked with other similar plano-sheets to provide a unitary magnifying assembly for use with visual optical displays.

An additional object of the invention is to provide a plastic fiber optic magnifying assembly from a semi-rigid yet relatively flexible flat sheet of plastic material as a result of compression or other molding of plastic material.

Further objects and advantages of the present invention will become readily apparent from the following detailed description of the invention when taken in conjunction with the drawings and appended claims wherein:

FIGURE 1 is an isometric view of a jig or fixture for use with the present invention;

FIGURE 2 is a section along the line 2—2 of FIGURE 1 illustrating the cutting tool shown in FIGURE 1;

FIGURE 3 is a view along the line 3—3 of FIGURE 2 of the cutting tool of FIGURE 1;

FIGURE 4 is a view along the line 4—4 of FIGURE 3 illustrating a portion of the cutting tool and the planar die member of FIGURE 1;

FIGURE 5 is a greatly enlarged plan view of a portion of the pattern die fabricated by the apparatus of FIGURE 1;

FIGURE 6 is a view of a portion of an electrohydraulic press with which the die is utilized in the method according to the present invention;

FIGURE 7 is a plan view of the plastic material molded into a planar sheet as taught by the present invention;

FIGURE 8 is a view along the line 8—8 of FIGURE 7 illustrating a greatly enlarged sectional view of a portion of the planar fiber optical sheet of FIGURE 7;

FIGURE 9 is a diagrammatic illustration of a unitary fiber optical assembly in accordance with the teachings of the present invention;

FIGURE 10 is a view along the line 10—10 of FIGURE 9 illustrating the front or output end of a fiber optical assembly;

Figure 17:
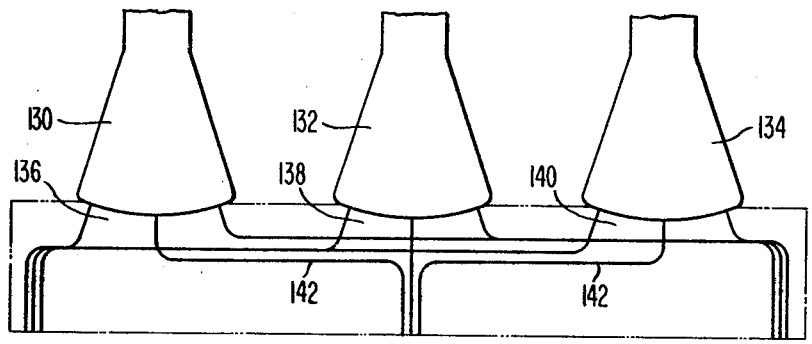
Figure 18:
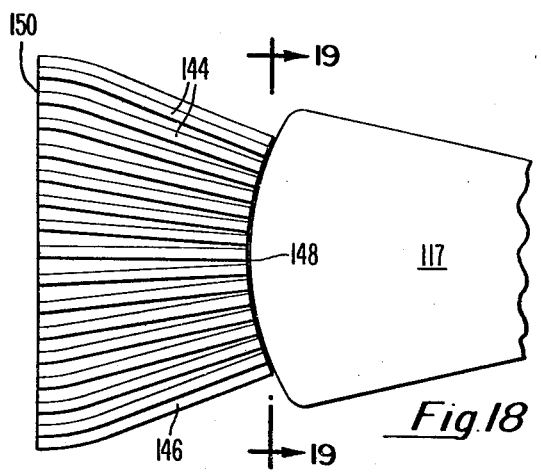
Figure 19:
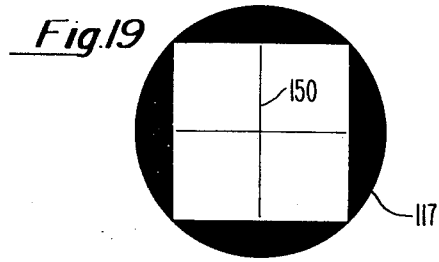
Figure 20:
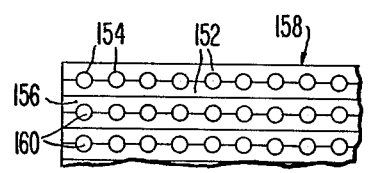
Figure 22:
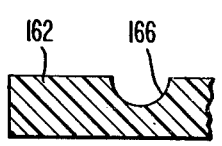
Figure 21:
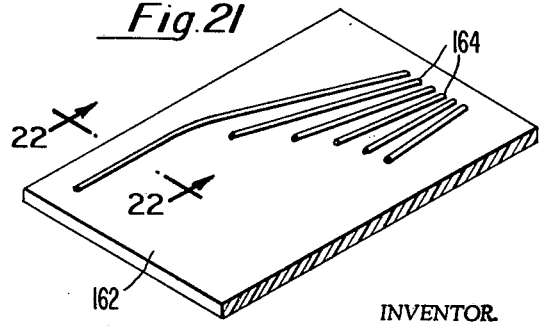
Figure 23:
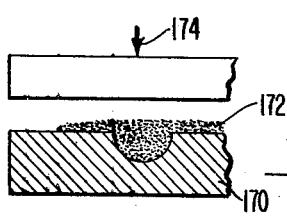
Figure 24:
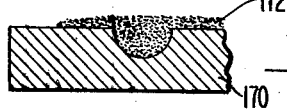

FIGURES 11, 12, and 13 illustrate end view of various forms of the stacked array of FIGURE 9;

FIGURE 14 is an isometric view of an additional modification of the present invention illustrating weight and interference reducing means formed in the fiber optic sheet;

FIGURE 15 is a front view of an assembly of stacked arrays similar to the array shown in FIGURE 9 mounted adjacent the output ends of a plurality of cathode ray tubes;

FIGURE 16 is an idealized diagrammatic view along the line 16—16 of FIGURE 15;

FIGURE 17 is an idealized diagrammatic view of a tri-color cathode ray tube utilizing the stacked fiber optic assembly of the present invention;

FIGURE 18 is a view similar to FIGURE 15 but illustrating a further modification of the fiber optic bundle embodying the present invention;

FIGURE 19 is a view along the line 19—19 of FIGURE 18;

FIGURE 20 is a plan view of a portion of a modified form of the present invention;

FIGURE 21 is an isometric view of another apparatus and method for producing the article of manufacture embodying the present invention;

FIGURE 22 is a partial sectional view along the line 22—22 of FIGURE 21;

FIGURE 23 is another view of the partial section of FIGURE 22 with the radial groove filled-in with plastic material; and FIGURE 24 is an additional partial sectional view of a further modified method of forming the article of manufacture shown in FIGURE 23.

A highly desirable and the most directly achievable "big-board" display would be, for example, an array of cathode ray tubes whose viewing screens would be substantially flat and substantially contiguous. The present invention involves a technique and method whereby the cathode ray tubes are viewed through optical devices so that each viewing screen appears plane and contiguous to that of its neighbors. The present invention also contemplates nesting the faceplate of each tube into one face of a plastic fiber magnifier whose other face is substantially flat and larger overall than the physical tube. The array of fiber optic devices, one for each tube, can then be assembled in an appropriate mechanical structure and constitutes the converting screen. As a further modification of the disclosed structural combination, the mechanical structure can support individual plug-in modules, each including one cathode ray tube.

The foregoing constitutes a real time "big-board" display in contrast to rapid film processing and display apparatus. Such equipment as aforedescribed can also be made to occupy relatively little space and is quite shallow in depth as compared, for example, with conventional front or rear projection apparatus.

It is highly desirable therefore, where large wall type displays are necessary or required, to be able to produce enlarged, continuously observable and useable images which flow into each other to the extent that there is little, if any, break between images or adjacent image displays. For example, in one application where as many as approximately two-hundred fifty cathode ray tubes are to be used, it is exceedingly difficult to form a continuous wall type display of this information. The present invention solves the foregoing problems in a new and novel and heretofore undisclosed manner by techniques, apparatus, method and the utilization of an article of manufacture produced thereby as hereinafter described in detail.

The utilization of fiber optics to transfer and/or magnify an image for example, from the output or display end of the cathode ray tube, to the face of a screen, has heretofore been difficult to accomplish because of the relatively high cost of the glass fiber optical bundle or stack which has been required. Also the display system whatever it is should be compatible with color CRT displays since it is very desirable particularly for the military but also for commercial applications, to have varying information viewed in different colors so that one color can be contrasted with another thereby to assist the observer in classifying the observed data.

According to one aspect of the method of the present invention, and with particular reference to FIGURES 1 through 10 of the drawings, there is first shown in FIGURE 1 a jig, fixture or templet 10 and a cutter 12 for producing an article of manufacture to be hereinafter identified and described. As seen particularly in FIGURE 1 the jig or fixture 10 includes a substantially protractor shaped base plate 14 having a radial edge portion 16 and a straight edge portion 16' to which a movable plate 18 is attached by means of pin 20 for pivotal arcuate movement thereover. A substantially rectangular plate 22 is attached to base plate 12, as by the bolts 24, in fixed, though demountable, relationship therewith. A tab-like projection 26 extends away from a corner portion of plate 22 and carries a dowel or pin 28 for locating the fixture 10 on a pivotal center about which the fixture may be rotatably moved, for purposes which will be described in more detail hereinafter.

The normally intersecting edges 30 and 32 of plate 22 are connected by a radial portion 34 extending therebetween. The right side of plate 18 is provided with an irregular edge portion 36 providing relief and clearance for the two plates when they are rotatably brough into abutting relationship, as for example, when it is desired to utilize the two edges 38 and 40 to produce a straight or substantially straight line. Arcuate movement of plate 18 relative to plate 22 enables the user to produce varying degrees of angular relationship between the two edges 38 and 40 and the radial edge 16 for purposes which will become clear as the present description proceeds.

The cutting tool 12, seen in the left portion of FIGURE 1, includes a base or carrier 42 on which additional portions thereof are demountably supported. Base member 42 is provided with a three-point support comprising three adjustable, threaded members 44, 46 and 48, respectively. Each of these members is threadedly engaged through respective apertures 44', 46' and 48'. Member 48 is disposed in the angled arm 50 which is attached to the base member 42 by means of the bolts 52. Member 46 is threadedly engaged through the base 42 while member 44 is threadedly disposed through a rectangular member 54 attached to the base as by bolts 56, only one of which is shown in FIGURE 2.

A cutter head 60 comprising an elongated rectangular bar is secured within an aperture 62 in member 54 and extends downwardly through the bifurcated end 64 of base 42 being detachably, slidably, adjustable vertically, up and down by means of bolts 66. The depending end 68 of the cutter 60 carries cutting material such as an industrial diamond 70, FIGURE 4, which is secured thereto in a known manner. The cutter 12 is provided with a pair of depending guide pins 72 for abutting engagement with the edge portions 38 and 40 of plates 18 and 22 and the radial edge 16 of base member 14, acting as guides for the cutting assembly.

In order that the diamond cutting element 60 can be seated properly and adjusted for depth and width of the cut, the cutter is canted at a slight angle relative to the perpendicular effectively providing appropriate cutting clearance, see FIGURE 4. This also makes for a truer cut. The guides 72 orient the cutter adjacent the longer edge formed by the three part templet or fixture 10 and enable the cutter bar to travel easily and smoothly along the length of the fixture carrying the cutter at the desired angle over the material. Cutter depth adjustment is or may be indicated by means of a scale 74 on the top of knurled knob 76 adjacent the vertically disposed sight bar 78, FIGURE 2.

In the preferred and illustrated embodiment of the present invention the material which is to be cut or engraved comprises rigid plate 80 over which the cutter is arranged to be moved, as by hand. It is to be understood that the choice of materials has to do with the end result rather than the inventive aspect of the method or technique or fixtures. Aluminum was chosen in the present instance since it has certain desirable characteristics of rigidity, temper, etc., as well as the ability to receive a groove cut therein without excess burr or chipping.

Depending upon the final result which is or may be desired the jig 10 is located on the flat planar member 80 with the dowel pin 28 secured in a suitable aperture 82, FIGURE 5, so that the jig can be arcuately adjusted about the pin 28 as a pivot point. The cutter 12 is adapted to be located on the member 80 adjacent the jig so that the guides 72 abut the edges 16, 38 and 40. Assuming it is desired to produce the pattern 84 in the member 80 in which a plurality of grooves 86 originate in a relatively closely spaced group at one end (right in FIGURE 5) and terminates in parallel spaced apart relationship (left in FIGURE 5) fanning out therebetween as shown, the cutter 12 is first disposed adjacent the pivot dowel 28 and is hand driven across (left in FIGURE 1) the plate 80 so that the guides follow the edges 40, 16 and 38.

As seen more particularly in the top plan view of FIGURE 5 and again in the detail of FIGURE 4, the present cutting instrument 12 is adapted to produce a substantially circular groove 86 in the base material 80. As with the choice of material, the choice of layout for the grooves depends on the desired degree of magnification as well as the length or distance through which the display image is to be conducted or transferred. Such is a matter of design choice. Since the cutter 12 is adjustable in three dimensions it is possible to accommodate a wide variety of fiber or strand formations. Other and different arrangements will be set forth hereinafter.

After the plate member 80 has been engraved with the desired pattern e.g. 84, FIGURE 5, the surface thereof may then be lapped at an angle so that the grooves 86 vary in depth from origination to termination i.e. from the right to the left side in FIGURE 5. The taper, if desired, can also be produced by the utilization of inclined (ramp) blocks in conjunction with the cutter 12 so that the cutter (i.e. members 44, 46 and 48) moves angularly upwardly or downwardly relative to the flat surface of the plate 80.

After the desired pattern has been produced as shown particularly in FIGURE 5, the finally engraved and or lapped and polished plate 80 is then introduced into a press 88, such for example, as an electrohydraulic press having upper and lower platens 90 and 92, each of which is or may be provided with a heating element 94 and means 96 for energizing the same from a suitable source of electrical power not shown.

With the press 88 open and the platens 90 and 92 separated, as seen in FIGURE 6, plate 80 is introduced there into and is seated upon the lower of the two platens. A quantity of compressible plastic material 97, such as acrylic resin powder is sprinkled relatively uniformly over the top surface of the plate 80 and into grooves 86.

In order to simplify the present technique only one engraved plate is used with the press rather than an obverse and reverse as in the usual course. A highly polished sheet e.g. ferrotype plate or tin such as is used in photography, is employed as the upper pressure plate 98 and is interposed over the mound of acrylic resin material 97.

The press is then closed in the direction of the arrow 100 while a pressure build-up of from 5 to 10 tons per square inch is produced. The heater units are energized to raise the temperature to approximately 350° C. effective to cause the plastic material to flow throughout the extent of the engraved grooves and in the spaces between grooves. After sufficient time has elapsed so that the actual flow of material is completed, the press is permitted to cool down. The press is then opened and the resulting article of manufacture 102 can be removed. Article 102 comprises a relatively thin sheet of plastic material having a plurality of elongated thread or fiber-like members 106 thereon interspersed by thinner web portions 108 therebetween and having the general outline and cross-sectional configuration of the grooves in reverse, as seen particularly in FIGURE 8.

Depending on the application with which the fiber optical article 102 is desired to be used the sheets may be cut to provide an outline configuration similar to that shown in the dashed outline 104 of FIGURE 7. A unitary assembly 110 of fiber optical elements may then be made from a plurality of sheets 102 cut, shaped or otherwise formed as in FIGURE 9 and stacked in a substantially rectangular array with the narrow end 112 spherically shaped to conform to the viewing end of a cathode ray tube FIGURE 16, while the outboard or display end 114 thereof is made to be substantially planar.

The front and rear as well as the sides of the assembly 110 are sealed with a potting compound material of a low index of refraction relative to the fibers or strands 106.

In order to avoid the problems of light leakage or cross talk from fiber to fiber an overcoating 106' may be applied to the fiber-like elements 106. This acts to provent any conduction of the light from fiber to fiber or from fiber to web 108 to fiber. Also the input ends portions of the fibers may be metalized.

As earlier mentioned herein, the actual structural configuration outline of the individual fibers are subject to many variations, permutations and combinations in order to accomodate the apparatus in a relatively, tightly, compacted assembly. To this end one of the configurational arrangements of FIGURES 11 through 13 may be used. In FIGURE 11 the outline configuration of the fiber optical planar sheet 102 described in connection with FIGURE 8 has been employed with the adjacent and contiguous sheets disposed in back to back relationship whereby each pair of half cylindrical fiber elements 106 are abutted together effectively forming a substantially circular-cylindrical elongated fiber.

In the configuration set forth in FIGURE 12, interleaving of oppositely disposed fiber optical elements 116 is produced by forming the elements 116 triangularly throughout their length and then disposing opposite faces of adjacent pairs of triangular elements contiguous to one another so as to provide an elongated, substantially rectangular, optical element.

The arrangement of FIGURE 13 is a still further modification of the fiber optical element wherein sheets of another and different shaped element 118 are interleaved and arranged in a stacked array.

Although an extreme minimum of cross-talk, i.e., light transfer from one fiber optical element through the webbing to another is observable, the construction of FIGURE 14 discloses a simple and effective method for eliminating such cross-talk if any, by interposing a plurality of apertures 120 in the flat connecting juncture or web 108 between elongated threat-like optical fiber elements 106. The apertures 120 interrupt the path of the light in such a manner as to avoid any transfer of light from one optical fiber element to another.

The present invention as earlier described herein, has for one of its objects the provision of large scale "wall" or "big-board" type displays as seen in the partial front view of FIGURE 15. As shown, a plurality of cathode ray tube or other image producing devices 117 are mounted adjacent and parallel to one another by means of suitable supports or scaffolding 122 and means 124 is included for securing individual fiber optical assemblies 102 constructed in accordance with the teaching set forth earlier herein, adjacent the display end 126 of the cathode ray tube and adjacent and contiguous to other end similar fiber optical assemblies thereby forming one large display area 128 as shown.

It can be seen from the illustration of FIGURE 15 that fabrication of fiber optical assemblies. In accordance with the teachings herein set forth, permits such units to be joined and stacked thereby to provide a relatively large scale flat planar wall type display. The details of construction of the mounting arrangement include well-known and readily available supporting techniques and apparatus and thus are not herein described in any great detail. Various types of supports 124 such as that shown in FIGURE 15 may be employed to permit the display to be stacked.

In certain applications it may be necessary or desirable that the information be displayed in color. To this end red, green and blue kinescopes or cathode ray tubes 130, 132, and 134 may be employed, FIGURE 17. Three separate and individual fiber optical bundles or assemblies 136, 138 and 140 fabricated in the manner earlier described here are disposed adjacent the faceplate of the tubes with the individual fiber optical elements 142 arranged in a layered manner e.g. horizontal color interlace. The planar sheets 102 lend themselves quite readily to the stacked arrangement for such displays and in this manner provide a large scale high efficiency three color display utilizing plastic fiber optics.

A brush or comb-like arrangement of optical fibers may be employed to provide the wall type display as taught by the present invention. As seen in FIGURE 18, light conducting elongated cylinders or cylinder like fibers 144 may be disposed on a carrier base member 146 in a configured array wherein the input end 148 is curved or shaped to accommodate the CRT faceplate e.g., spherical while the output or viewing end 150 is substantially flat. As with the earlier described fiber optical assemblies the fiber elements 144 are arranged so that they are closer together although spaced apart at the input end than at the output end whereby a magnified image results at the viewing portion of the apparatus.

This construction which can take the form of relatively flat planar sheets which are then stacked into a thick, uniformly arrayed assembly can be disposed adjacent the faceplate of the CRT 112 or the assembly of fiber optic elements can be bonded to the faceplate material in any suitable manner, as by adhesive.

A further extension of the inventive concept hereinabove set forth makes use of the fiber optic assembly as an integral part of the faceplate of the CRT. In this latter construction the CRT faceplate is made relatively thin in cross-section and the plastic fiber optic assembly is bonded thereto so as to provide for a higher resolution display since the relatively thick CRT faceplate is no longer required as well as making possible a flatter faceplate which can be very useful where lower degrees of magnification are required.

FIGURE 19 illustrates the forward end of a cathode ray tube which has had a reticle 150 disposed thereon dividing the viewing area into four substantially identical rectangles for calibration purposes and with which the herein described fiber optical assembly may be employed to provide suitable magnification.

Still another modification of the method and construction in accordance with the present invention is set forth in FIGURE 20. As shown, a plurality of semi-rigid, yet deformable members 152 of suitable low index of refraction material are provided with a plurality of grooves 154 extending from end to end thereof and disposed in spaced apart relation as before with the grooves 154 at the input ends disposed relatively closely together and with the grooves at the output end 156 arranged in a fanned out orthogonal array. The members 152 are then stacked together and bonded into a unitary assembly 158 as by suitable adhesive. Thereafter light transmitting or conducting epoxy material 160 of a higher index of refraction than the members 152 is flowed into the openings provided by the grooves 154 to fill the same substantially flush with the exposed front and rear surfaces. The unitary assembly is then lapped and polished and/or coated and sealed so as to provide a solid, physical, unified assembly. The assembly thus formed may, as before, be shaped to accommodate a CRT faceplate at one end and a flat viewing surface at the opposite end thereof.

The unitary assemblies resulting from the foregoing techniques and method can easily, simply and efficiently be adopted for plug-in module utilization by suitably forming the individual units so that side by side, building block construction can be provided thereby. In this manner the individual fiber optic units can be added to or removed from a wall type display without interfering with or disturbing the CRT arrangement.

Still another novel technique for producing a fiber optical assembly which also has the capability, if desired, of magnifying the display image for viewing the same e.g. as a wall type display is shown in detail in FIGURES 21 through 24 inclusive. A deformable plate 162, e.g., plastic, FIGURE 21 has arrayed on one surface thereof a plurality of relatively hard wire-like elements 164 in a desired pattern e.g. similar to the pattern 84 in FIGURE 5. The wire-like elements 164 are pressed into the surface of the base plate 162 by means not shown but which, for example, might include the upper platen of a press. The plate 162 is thereby deformed or embossed in accordance with the desired pattern. In this manner there is provided a series of grooves such as groove 166, FIGURE 22, having a circular or radial configuration such as that shown. Thereafter the grooves may be filled with flowable plastic 168 of a liquid form for example, to provide the display shown in FIGURE 18. Or, if desired, a mold plate 170 (obverse or reverse) formed in the manner above set forth, can be employed with the press 88 described in connection with FIGURE 6. In this latter case, acrylic resin powder 172, for example, may be deposited on the top surface of the plate 162 and thereafter the press closed in the direction of the arrow 174, under suitable pressure, to form after cooling a fiber optical sheet similar to the fiber optical sheet 102 formed by the means described in connection with FIGURES 6 and 7.

The present invention is also applicable to that type of construction known as "back plane" wiring wherein it is desirable or necessary to conduct light from a source at one surface or plane to a photo-optical or other "sensor" device located at some distance behind such source. The apparatus of the present invention lends itself extremely, efficiently to such configurations acting therein in the nature of multiple light pipes or light conducting pathways e.g. from a front plane to a back plane.

Where there is or may be relative movement between the display input device and the fiber optic display itself, the present constructions provide an efficient means for retaining the viewing image intact without loss of detail since the fiber material is sufficiently flexible to move with any vibration while simultaneously conducting light from CRT to viewer without interruption.

Mass production of fiber optic assemblies can be accomplished relatively simply, easily and efficiently by employing the techniques of electroforming and/or electroplating. In this instance the desired pattern is set up in a suitable jig or fixture which may include a pair of spaced apart holders disposed on a backing plate and between which a pattern of the desired size wire is stretched and arranged and held flat against the backing plate. Suitable wax is flowed under and around the wires so as to secure the pattern to the backing plate. The wires are then lapped to the desired depth and/or tapered from end to end after which the wire assembly is coated with conductive paint, powder or other conductive material which will produce good electrical conductivity.

The assembly is then placed in a plating tank and the wires electroformed to provide a metallic image of the pattern. The metal image is then utilized to provide stampers (die faces) or molding plates which can then be used to form the final fiber optic article of manufacture described hereinbefore.

I claim:

1. The method of producing a fiber optical article of manufacture comprising the steps of,
   (a) providing a pattern of spaced apart elongated fibers in a deformable member such that elemental portions of said pattern are laterally displaced throughout their length from origination to termination thereof, and
   (b) molding into said pattern in said deformable member under elevated heat and pressure a quantity of material capable of deformation and agglutination into a unitary structural assembly embodying said pattern and resulting in a light conducting image transmitting assembly,
   (c) said lateral displacement of the elemental portions of the pattern in said deformable member being effective when said pattern is energized with light causing the resulting optical fiber assembly to magnify the image from the entering end of the assembly to the viewing end thereof.

2. The method of producing a fiber optical article of manufacture comprising the step of,
   (a) providing a pattern of lands and grooves in a rigid member in a manner such that discrete elements of said pattern are laterally displaced relative to one another from origination to termination,
   (b) molding into said pattern of lands and grooves under elevated heat and pressure a quantity of material capable of being deformed and agglutinated into a unitary structural assembly embodying said pattern and resulting in a light conducting image transmitting assembly, (c) said lateral displacement of said lands and grooves relative to one another in the molded material being effective when energized with visible light to permit the resulting optical fiber assembly to magnify the entering image whereby to display at the viewing end of the assembly a relatively larger size image, (d) repeating said molding operation to provide a plurality of flat planar fiber optical sheets, (e) thereafter impregnating each of said sheets with an adhesive, and (f) finally stacking said sheets together into an adhesively bonded unitary assembly wherein the input end is shaped to accommodate a display device while the output end is substantially flat.

3. The method of producing a fiber optical article of manufacture comprising the steps of, (a) molding into a slightly deformable, relatively rigid member the impression of a plurality of thread or wire-like members thereby to form a pattern of fiber optical elements in said rigid member, said pattern of elements being spaced apart lengthwise and having a taper both horizontally and vertically, (b) molding into said pattern in said rigid member material capable of assuming a solid outline of said pattern as a result of the application of heat and pressure to said rigid member thereby forming a planar sheet-like light conducting image transmitting assembly, and (c) stacking and adhesively bonding a plurality of said sheet-like assemblies together to form a substantially cubical unitary fiber optical light transmitting image magnifying apparatus.

4. The method of producing a fiber optical article of manufacture comprising the steps of, (a) providing a pattern of elongated fiber-like grooves in a plastic body of low index of refraction material in a manner such that the grooves are spaced apart throughout their length being closer together at one end thereof than at the opposite end of said body and wherein said grooves are shallower in cross-section at one end than at the opposite end thereof, (b) stacking together a plurality of plastic bodies formed in accordance with the previous step and securing the same into a compacted assembly, (c) introducing into said pattern of elongated grooves light conducting material of a higher index refraction than said body material thereby forming a fiber optical array effective when energized with visible light of conducting an entering image from the entering end thereof to the viewing end at substantial magnification.

5. The method of producing a fiber optical article of manufacture comprising the steps of, (a) providing a pattern of spaced apart elongated grooves in a rigid member such that elemental portions of said pattern are laterally displaced from origination to termination thereof, (b) molding into said pattern in said rigid member a quantity of material capable of deformation and agglutination into a unitary structural assembly embodying said pattern and resulting in a light conducting image transmitting assembly, and (c) arranging said pattern for the reception of a light image at an end thereof and for viewing display at the opposite end, (d) said lateral displacement of the elemental portions of the pattern in said molded material being effective when said pattern is energized with light to cause the resulting optical fiber assembly to magnify the image from the entering end of the assembly to the viewing end thereof.

6. The method of producing a fiber optical article of manufacture comprising the steps of, (a) providing a pattern of lands and grooves in a rigid member in a manner such that discrete elements of said pattern are laterally displaced horizontally and vertically relative to one another from origination to termination, and (b) molding into said pattern of lands and grooves in said rigid member under elevated heat and pressure a quantity of material capable of being deformed and agglutinated into a unitary structural assembly embodying said pattern and resulting in a light conducting assembly, (c) said lateral displacement of said lands and grooves relative to one another in said molded material being effective when said assembly is energized with visible light to permit the assembly to magnify the image at the entering end thereby to display at the viewing end of the assembly a larger size image than that introduced at the entering end.

References Cited

UNITED STATES PATENTS

| | | | |
|---|---|---|---|
| 2,101,540 | 12/1937 | Gullich | 264—320 |
| 2,339,433 | 1/1944 | Staehle | 264—1 |
| 2,342,378 | 2/1944 | Smith | 264—1 |
| 3,071,814 | 1/1963 | Guggenheim | 264—320 |
| 3,110,816 | 12/1963 | Kaiser et al. | 250—227 |
| 3,119,678 | 1/1964 | Bazinet | 264—1 X |
| 3,128,167 | 4/1964 | Woodcock | 65—36 |
| 3,148,967 | 9/1964 | Hicks | 264—1 X |
| 3,235,438 | 2/1966 | Wisotzky | 264—243 X |
| 3,241,429 | 3/1966 | Rice et al. | 156—2½ X |
| 3,301,648 | 1/1967 | Sheldon | 65—4 |
| 3,317,640 | 5/1967 | Jones | 264—220 X |
| 3,431,327 | 3/1969 | Tsuetaki | 264—1 |
| 3,437,724 | 4/1969 | Carnall | 264—1 |

HAROLD ANSHER, Primary Examiner

U.S. Cl. X.R.

156—296; 264—1, 107, 126, 220, 243, 320, 331